Nov. 7, 1933.  R. VERDEROSA  1,934,156
METHOD OF APPLYING DECORATIVE COMPOSITIONS

Filed Feb. 28, 1931

Rose Verderosa
INVENTOR

BY Darby & Darby
ATTORNEYS

Patented Nov. 7, 1933

1,934,156

UNITED STATES PATENT OFFICE 1,934,156

METHOD OF APPLYING DECORATIVE COMPOSITIONS

Rose Verderosa, Brooklyn, N. Y.

Application February 28, 1931. Serial No. 519,012

2 Claims. (Cl. 41—24)

This invention relates to decorative compositions adapted for application to surfaces for ornamentation purposes, and to the method of applying the same.

A further object of the invention is to provide a method of applying a decorative composition to surfaces in simulation of the rough natural surface appearance of the bark of a tree.

Other objects of the invention will appear more fully hereinafter.

The invention consists substantially in the composition, steps and mode of procedure, all as will be more fully hereinafter set forth, as illustrated in the accompanying drawing, and finally pointed out in the appended claims.

Referring to the accompanying drawing.

Figure 1:
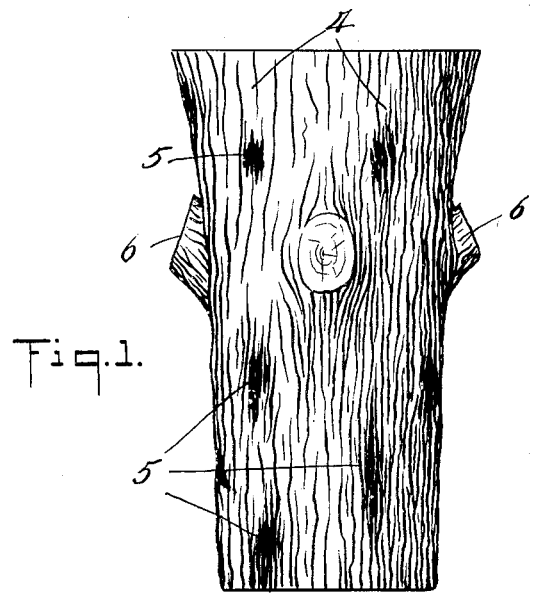
Figure 1 is a view in elevation showing a glass tumbler having an ornamentation applied to the exterior surface thereof, in accordance with and in utilization of a composition of my invention.
Figure 2:
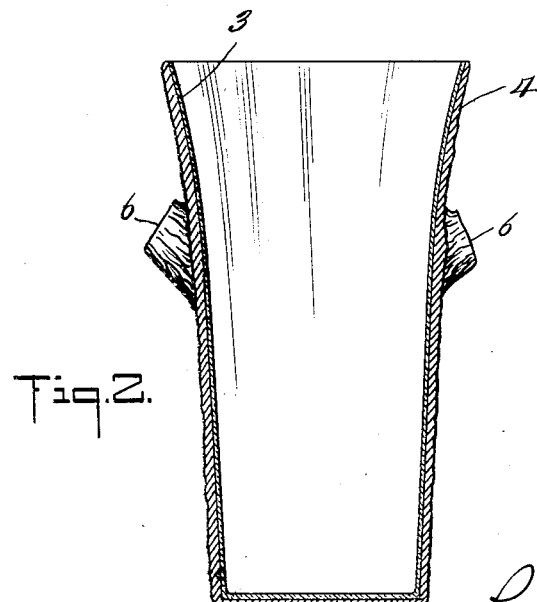
Figure 2 is a view in central longitudinal section of Figure 1.

In carrying out my invention I propose to make up a composition material consisting of a mixture of fibrous pulp, an adhesive material, and a suitable coloring matter.

I have found that a pulp material suitable for use in carrying out, and to constitute the body of the decorative composition of, my invention, may be produced or formed from any suitable vegetable fibrous stock, such, for example, as wood pulp, pulp made from rags, refuse from sugar mills, old newspapers, or the like. In practice, I have found that a pulp made from ordinary newspapers well answers the purpose, besides being easily worked and economical. The selected fibrous pulp material may be reduced to pulp condition in the usual or any preferred way. For example, where ordinary newspaper is employed, the newspaper is torn or macerated and then pulped in water. A convenient way to pulp this material is to rub the same over a fluted or roughened surface, such, for example, as a washboard, so as to reduce the material to a more or less fine pulpy mass and a more or less fluid condition.

For an adhesive material, I prefer to employ a farinaceous material, such as starch, wheat-flour, meal or the like, though it is obvious that other adhesives may well answer the purpose. I have found that ordinary wheat-flour forms an excellent adhesive material for use in carrying out my invention. The adhesive element is formed into a paste. This can be conveniently accomplished by boiling the selected adhesive material in water and stirring the same to reduce it to paste condition and to the desired consistency.

Any suitable or desired coloring material may be employed, depending upon the color of the particular wood bark or other surface to be simulated. In practice, I have found that for the production of an ornamentation and simulation of the appearance of wood or tree bark, ordinary lamp black may be employed for the coloring matter. For other color effects other suitable coloring matter may be used, such as yellow ocher, aniline dye, or the like.

After the selected fibrous material to be formed into pulp to constitute the body of the composition has been reduced to the desired pulpy mass condition, the excess of water is drained from the mass leaving it in a sufficiently damp or moistened condition to render the same capable of being easily worked or manipulated by hand or otherwise. The adhesive material or paste is then added to the pulp in about equal proportions by weight. To this mass a sufficient amount of lamp black or other coloring material is added to secure the desired color effect, say, in the case of lamp black, about a tablespoonful for two pounds of the mixture of pulp and adhesive, depending upon the particular degree of color to be produced. The mass is then thoroughly stirred and mixed by kneading the same into a dough mass. The composition is then ready for application.

The composition may be applied to any surface to be ornamented or decorated, such as glass, wood, wall surface, plaster surface, or the like. The application to a surface to be decorated may be effected in any suitable or convenient manner. I have found it sufficient to apply the same by hand, but I do not desire to be limited or restricted in this respect as the same may be applied, if in a sufficiently plastic or liquid state, by air blast, or otherwise, so as to apply or work the composition material thoroughly onto the surface to be ornamented in a thin coating, preferably, though not necessarily, of substantially even thickness.

When applied to the surface to be ornamented, the material is worked by hand or by any suitable tool, such, for example, as a knife blade, or otherwise, so as to simulate in surface contour and appearance the ridges and valleys of the bark of a tree. If desired, and preferably, in order to carry out the simulation, lumps of the composition may be formed at various points to simulate the knots left by the removal of twigs, branches, or the like. Of course, this manipulation of the composition in applying the same to a surface to be decorated will depend more or less on the particular surface effect to be produced. The result of the manipulation is to impart a surface appearance to secure the desired ornamental effect, such as a rough rusty appearance of a tree bark, if that is the ornamentation desired. Of course my invention is not to be limited or restricted in this respect.

The article to which the composition has been applied is then set aside to dry, and for the composition to set and harden. The drying may be accomplished simply by air drying or in an oven, or otherwise, as may be most convenient.

In order to still further simulate the tree bark effect the ornamentation surface may be suitably colored or tinted with a suitable lead paint, varnish, shellac, lacquer or the like, preferably containing a suitable drier. This pointing of the surface with the paint, varnish, or other material, may be effected at indiscriminate places throughout the ornamentation surface to impart a variegated coloring effect, and the portions of the surface representing twigs or branches cut or removed from the tree may be suitably pointed with the paint or varnish material to simulate a cross-section cut or area of the removed branch, in simulation of the stump or knot left on the bole of the tree.

In the drawing I have illustrated an application of an ornamenting composition, in accordance with my invention, to the surface of a tumbler 3, the ridges and dales of the bark effect being indicated at 4. The indiscriminately interspersed blotches being indicated at 5, and the projections, knots or butt ends of removed branches being indicated at 6.

From the foregoing description, it will be seen that I provide an exceedingly simple and economical decorating composition, and a mode of applying the same, to produce an attractive and artistic surface ornamentation in simulation of desired natural surfaces, such as the rustic surface appearance of tree barks.

As above stated, the composition may be applied to any desired surface for ornamentation of various articles such as bowls, flower pots, water bottles, glasses, panels, wall surfaces or the like. Where applied to tumblers, vases, flower pots, or like articles, of a generally cylindrical contour, the completed ornamented article has the appearance of a section or sort length of a tree, for example, with the external simulation of and appearance of the natural back of the tree.

Having now set forth the objects and nature of my invention, and a method of carrying the same into practical operation, what I claim as new and useful, and of my own invention, and desire to secure by Letters Patent is:

1. The method which consists in mixing and kneading together into a plastic dough mass, a pulp material, a paste material and coloring matter, then applying the same as a coating to a surface to be ornamented, manipulating such coating into the simulation of the surface appearance of the bark of a tree, and forming the coating composition into lumps or projections at various points to simulate the stump ends of removed branches or twigs.

2. The method which consists in mixing and kneading together into a plastic dough mass, a pulp material, a paste material, and coloring matter, then applying the same as a coating to a surface to be ornamented, manipulating such coating into the simulation of the surface appearance of the bark of a tree, forming lumps or projections in said coating to simulate the stump ends of removed branches or twigs, and applying paint material of variegated colors at indiscriminate points in the ornamented surface to enhance the simulation of the wood bark effect.

ROSE VERDEROSA.